(12) United States Patent
Martin

(10) Patent No.: US 12,246,401 B1
(45) Date of Patent: Mar. 11, 2025

(54) METHOD FOR STUD WELDING AND FASTENING METAL DECKING TO A STRUCTURAL FRAME AND METAL DECKING WITH BEAM LOCATOR OPENINGS

(71) Applicant: New Rule Products, Inc., St. Charles, MO (US)

(72) Inventor: Gerald D. Martin, St. Charles, MO (US)

(73) Assignee: New Rule Products, Inc., St. Charles, MO (US)

( * ) Notice: Subject to any disclaimer, the term of this patent is extended or adjusted under 35 U.S.C. 154(b) by 911 days.

(21) Appl. No.: 17/188,612

(22) Filed: Mar. 1, 2021

Related U.S. Application Data

(60) Provisional application No. 62/983,623, filed on Feb. 29, 2020.

(51) Int. Cl.
    *B23K 9/20*            (2006.01)
    *B23K 37/02*          (2006.01)
    *E04B 5/10*           (2006.01)

(52) U.S. Cl.
CPC .......... *B23K 9/202* (2013.01); *B23K 37/0205* (2013.01); *B23K 37/0282* (2013.01); *E04B 5/10* (2013.01)

(58) Field of Classification Search
CPC ........................ B23K 9/202; B23K 37/0205; B23K 37/0282; E04B 5/10
See application file for complete search history.

(56) References Cited

U.S. PATENT DOCUMENTS

| | | | | |
|---|---|---|---|---|
| 4,068,446 A | * | 1/1978 | Brueske | E04D 15/00 52/143 |
| 4,421,242 A | * | 12/1983 | Brueske | B66C 23/205 52/749.1 |
| 4,600,118 A | | 7/1986 | Martin | |
| 5,704,815 A | | 1/1998 | Shibata et al. | |
| 5,865,341 A | | 2/1999 | Martin | |
| 6,216,416 B1 | * | 4/2001 | West | E04G 3/26 52/749.12 |
| 7,451,893 B2 | | 11/2008 | Martin | |
| 8,342,545 B2 | * | 1/2013 | Mayo | E04D 15/04 280/79.7 |
| 8,505,772 B2 | | 8/2013 | Martin | |

(Continued)

*Primary Examiner* — Brian W Jennison
(74) *Attorney, Agent, or Firm* — Grace J. Fishel

(57) ABSTRACT

An ergonomic method for a composite floor structure with metal decking having ribs and flat sections with openings in the flat sections over the center of the I-beams for fastening and flattening the decking on the I-beams, removing contaminates from the I-beams through the openings to form a clean welding zone and welding studs in the clean welding zones. Tools for fastening, removing contaminates and welding are carried by carts having a bottom frame with rollers and an outrigger that keeps a working end of the tool perpendicular to the composite floor structure. In operation as the carts are rolled over the metal decking the rollers contact the ribs while other rollers extend over and free from contacting the flat sections. The carts have a tool balancer to minimize the effort required of a worker to raise and lower the tool into working position from an upright position.

6 Claims, 18 Drawing Sheets

(56) References Cited

U.S. PATENT DOCUMENTS

| | | | | |
|---|---|---|---|---|
| 8,507,824 B2* | 8/2013 | Martin | ............... | E04D 15/04 |
| | | | | 118/305 |
| 8,863,466 B1* | 10/2014 | Winter | ............... | E04B 5/023 |
| | | | | 52/634 |
| 9,630,270 B2 | 4/2017 | Martin | | |
| 10,655,335 B2* | 5/2020 | Jeffs | ............... | B62D 21/18 |
| 2011/0210110 A1* | 9/2011 | Dearman | ............... | B23K 37/0282 |
| | | | | 219/136 |
| 2015/0129568 A1* | 5/2015 | Miller | ............... | B23K 37/0294 |
| | | | | 219/137.2 |
| 2015/0321280 A1* | 11/2015 | Einav | ............... | B23K 31/125 |
| | | | | 228/9 |
| 2017/0057000 A1* | 3/2017 | Hsu | ............... | B23K 9/12 |
| 2019/0048584 A1* | 2/2019 | Lestini | ............... | E04B 5/10 |
| 2019/0329365 A1* | 10/2019 | Simon | ............... | B23K 37/0282 |
| 2020/0023872 A1* | 1/2020 | McCrillis | ............... | B23K 37/0288 |
| 2020/0061754 A1* | 2/2020 | Neumayr | ............... | B23K 37/0282 |

* cited by examiner

METHOD FOR STUD WELDING AND FASTENING METAL DECKING TO A STRUCTURAL FRAME AND METAL DECKING WITH BEAM LOCATOR OPENINGS

BACKGROUND OF THE INVENTION

Field of the Invention

The present invention relates to metal decking with openings and covers and to improved methods for fastening the decking and welding studs to the structural frame members in composite construction.

Brief Description of the Prior Art

General Concerns with Traditional Composite Construction

Structural engineers who design traditional composite steel structures such as hospitals, low and high rise office buildings, stadiums, airports, steel bridges, etc. often require the structure's steel to be painted, galvanized or have some form of protective coating applied to the structures steel members before erection begins. A protective coating protects the structural steel frame from elements like moisture. Moisture lying on bare beams or girders can eventually cause rust, which can then weaken the integrity of the structure. It is critical for a structure's steel frame to remain intact over time.

Structural engineers may also remove up to 35% of the structure's steel by employing a method known as stud welding wherein stud shear connectors are welded to the horizontal beams. This process, more broadly known as "composite design", allows the strength of the concrete to be transferred to the strength of the steel, thus replacing the removed steel.

However, when utilizing the stud welding method, the "upper flange" portion of the horizontal beams or girders must be in an original bare steel condition and void of any protective coating for optimum stud welding conditions. Any amount of mill scale, rust, paint overspray, painted surface, galvanizing, etc. on the upper flange or welding surface of the beam or girder is a contaminant to the optimum welding process and is out of sight through the decking. The metal decking thickness and the amount of galvanize which can vary over a sheet of floor decking also affects optimum stud welding conditions and the quality of the weld obtained. Another important factor affecting weld quality is whether the deck is down tight against the supporting I-beams as an air gap stops a sustaining arc during the stud welding cycle thus failing to accomplish an optimum weld.

Problems in Detail with the Traditional Method
Sequence of Events to Complete the Task of Composite Construction:

Setting Steel That Is Not Painted Or Coated Completely And Protecting The Bare Surfaces From The Elements: Vertical columns left plain as they come from the factory will immediately begin to rust. To prevent rust, the columns may be painted, galvanized or coated with a material including fire proofing. The horizontal beams may also have a similar protection applied to them but "not onto a upper flange of the beam" because the upper flange should be free of mill-scale, rust, overspray from paint, completely unpainted, no galvanize, no fire proofing, etc. so that the stud welding process will actually produce a 100% cross sectional weld.

Laying Decking: A two to four person crew will lay individual pieces of decking. The weight or length of the decking determines the size of the crew. A problem occurs to a following crew once the decking is laid as the beams are no longer in view.

Flattening The Decking: The "roll formed decking" may not be naturally flat. However the decking needs to be flat and tight on the upper flange of the steel beam for subsequent fastening. But a worker cannot see through the decking and does not know if the decking is down tight.

Fastening The Decking: Typically a ⅝" puddle weld is a preferred method of fastening the decking to the beam. But with the beams out of view, a worker cannot confirm that a weld actually penetrated the metal decking all of the way and into the upper flange of the beam. Stepping on an improperly fastened decking without full ⅝" diameter puddle welds can cause the decking to slip and a worker to fall to their death or receive serious injury.

Alternate Methods Of Fastening Composite Decking Versus Puddle Welding: An air compressor gun can be used to secure the decking but the gun is heavy and requires an air compressor, long air hoses, etc. A self-tapping screw gun can also be used but the screws have trouble penetrating anything thicker than ¼" decking thickness and many composite decking thicknesses are from ⅜" thick to ¾" thick. A still further method makes use of a powder actuated decking fastener. The tool weighs over 26 pounds and it must be held perpendicular to the decking and is hard for an average worker ergonomically to operate.

With each of the method it is important than the decking be down tight to secure a good puddle weld or fastener placement.

Finding The Center Of Each Beam To Achieve Optimum Weld Results: Once the decking is laid, the beams supporting the decking are hidden and because of the "sweep" in these beams, a worker cannot locate the center of the underlying beam. If a welder misses the center of the beam, "arc blow" results in an incomplete, imperfect weld caused by welding away from a proper magnetic field over the center of the beam.

Guaranteeing A Clean Weld Surface: There is no present method to assure a clean weld surface on the upper flange of the beam as it comes to a job site. There will be a variety of mill-scale on every beam and the beams start rusting immediately. If the lower beam is spray painted, there is no easy way to determine the amount of overspray on the upper flange. A welding machine is set to apply the same condition to every weld but every weld zone with different amounts of contamination is different. Therefore some welds will be too hot or long and some welds will be too short or cold. Since the ironworker cannot see below or the underside of the decking, the worker cannot accurately determine what happens in the weld. The traditional method of tapping on the welded stud and listening to its tone is not enough to determine weld quality.

Guaranteeing There Is Not Too Much Decking Thickness Or Galvanize For Optimum Weld Results: Galvanizing the decking with a G60 or G90 coating to prevent rusting is usually money well spent but the thickness of the galvanizing usually varies on the plus side across a sheet. Galvanizing is a contaminate for the stud welding process and with the variation in the galvanizing thickness the condition, the welding zone differs from location to location and adds an additional degree of difficulty as it must be welded through before reaching the beam. Galvanizing fumes are also a contaminate for ironworkers to breath during the time they are bent over with unprotected faces within 24" to 30" of the weld zone during the welding process.

Reducing The Degree Of Difficulty To Obtain A Certified Weld That Replaces Up To 35% of The Structures Missing Steel Is Paramount: The traditional method of building a composite structure needs improvement regarding coating the upper flange of the structural I-beams and increasing quality assurance regarding stud welding which replaces up to 35% of a composite structure's missing steel.

BRIEF SUMMARY OF THE INVENTION

In view of the above, it is an object of the present invention to provide the following benefits:
1. An ergonomic method for fastening and flattening a composite floor structure with metal decking having openings over the center of underlying I-beams with a cart that functions to flatten the deck while supporting fastening tools. The fastening and flattening cart has a roller assembly for effective flattening and an outrigger that maintains the cart parallel with the composite floor structure for attaching fasteners.
2. A method for measuring the optimum fastener attachment with an analyzer carried by the cart for flattening and fastening the deck for use in confirming that the deck has been properly fastened to the I-beams.
3. An ergonomic method for grinding the top flange of an I-beam through the openings in the metal decking with a contaminate removal cart that carries grinding equipment to provide a clean weld surface. The cart has a roller assembly and an outrigger that maintains the cart parallel with the composite floor structure.
4. A tool balancer on the flattening and fastening cart that allows a worker to apply less pressure on the tools to actuate them while standing upright.
5. An ergonomic method for welding studs in the clean weld surface prepared by contaminate removal cart with a stud welding cart as describe in U.S. Pat. No. 8,507,824, issued Aug. 13, 2013 for System for Processing Floor Decking of Structures and U.S. Pat. No. 9,630,270, issued Apr. 25, 2017, for Cart and Apparatus for Welding Studs which are incorporated by reference herein.

BRIEF DESCRIPTION OF THE SEVERAL VIEWS OF THE DRAWINGS

In the accompanying drawings, in which several of various possible embodiments of the invention are illustrated, in which.

DETAILED DESCRIPTION OF AT LEAST ONE PREFERRED EMBODIMENT OF THE INVENTION

Figure 1:
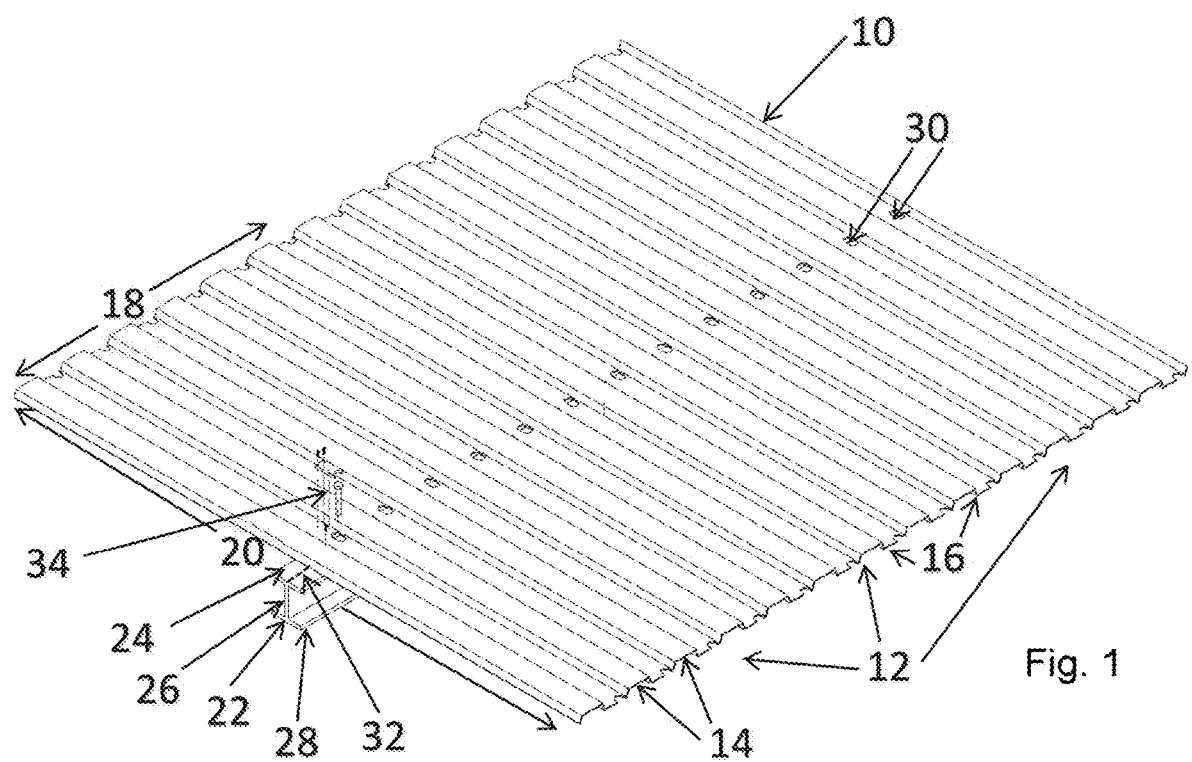
FIG. 1 is a perspective view of a composite floor structure in accordance with the present invention to be flattened, fastened, ground to form a welding zone and stud welded.

Referring to the drawings more particularly, a metal decking panel for use in composite floor structure 10 as shown in FIG. 1, includes metal decking panels 12 with a plurality of longitudinally oriented hollow ribs 14 disposed in generally parallel spaced relationship with a flat panel section 16 disposed between adjacent ribs. Metal decking panels 12 have opposing width sides 18 and opposing length sides 20 and may be provided in different widths, typically 24" or 36", and different lengths, typically 20' or 30' lengths, but other widths and lengths may be used. Metal decking panel 12 is typically formed of 16 to 22 gauge steel and panels may be stacked double thickness or more and plain, coated or galvanized. Length side 20 of each decking panel 12 will nestle into the next panel for a continuous floor construction. In an illustrative but non-limiting example, a 24" panel, ribs 14 may be 4¾" wide with a center reinforcing rib ½" high. Flat panel sections 16 may also be 4¾" wide with a center reinforcing rib that is ½" high.

As shown in FIG. 1, a plurality of decking panels 12 are positioned on underlying I-beams 22 positioned along width sides 18 and midway along length side 20. Each of I-beams has an upper flange 24, a web 26 and a lower flange 28. Upper flange 24 is in underlying contact with flat panel section 16 of metal decking panels 12. I-beams 22 are formed of steel and may be coated with mill scale, rust, paint, insulation, galvanizing or the like.

Flat panel sections 16 of metal decking panels 12 have a plurality of openings 30 engineered to align with a theoretical centerline 32 of each of the underlying I-beams. Openings 30 are punched, cut or otherwise formed in decking panels 12. Each of openings 30 is sized such a stud 34 may be passed through. In other instances, opening 30 may be sized to pass both stud 34 and a support ferrule (not shown) through. With I-beams 22 having an 8" wide upper flange 24, openings 1½ by 4" have been found satisfactory as has a 1½" circle or a 1½ by 2½ oval. Other shapes are sizes of openings 30 are possible.

Figure 2:
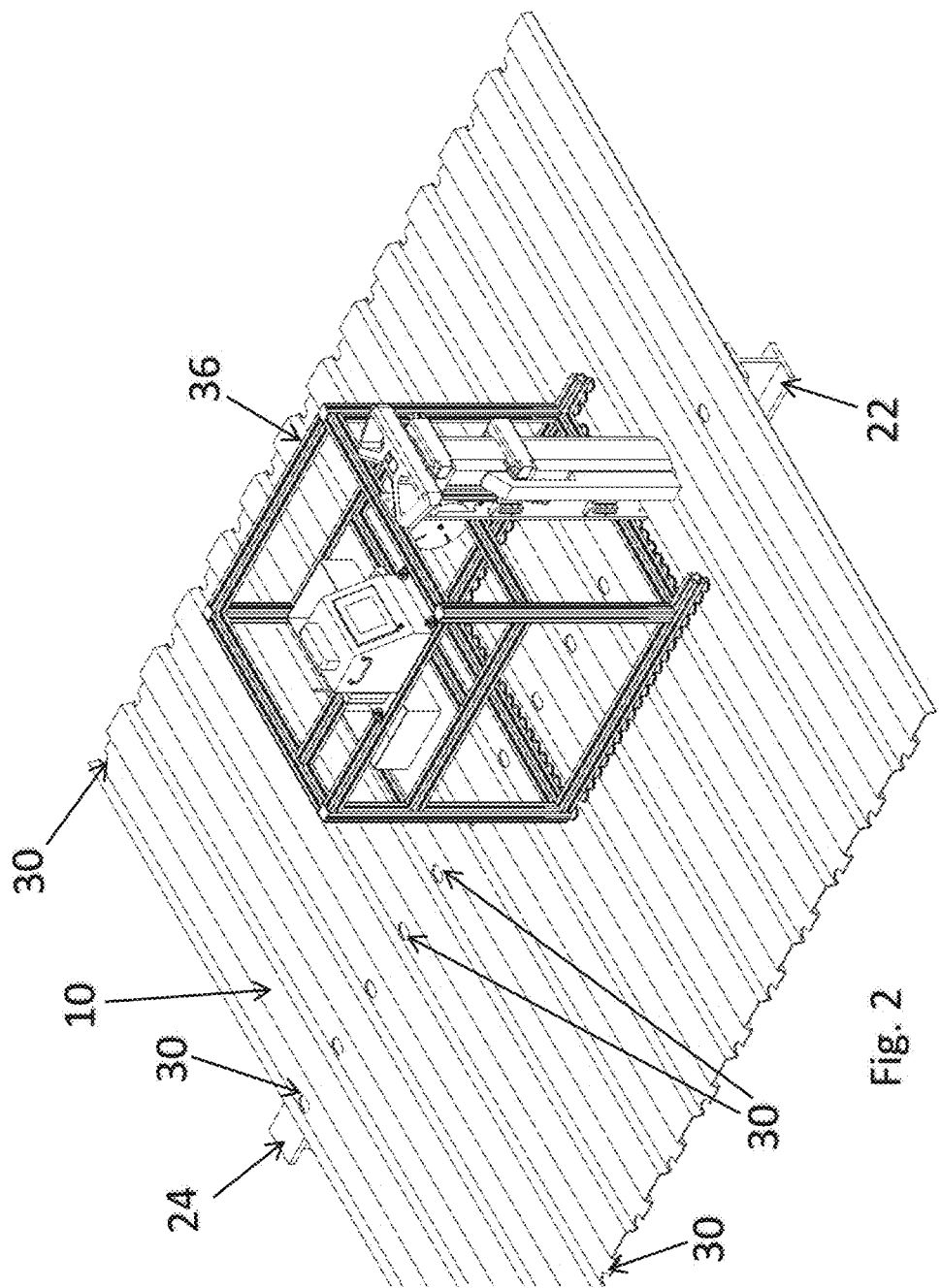
FIG. 2 is a perspective view of a composite floor structure wherein the flange of horizontal beams has been painted. A flattening and fastening cart is shown in process of flattening and fastening the deck panels to the top flange of the supporting I-beam so that an inspector can visually see through the openings that the deck is down tight and the fasteners are properly installed.
Figure 3:
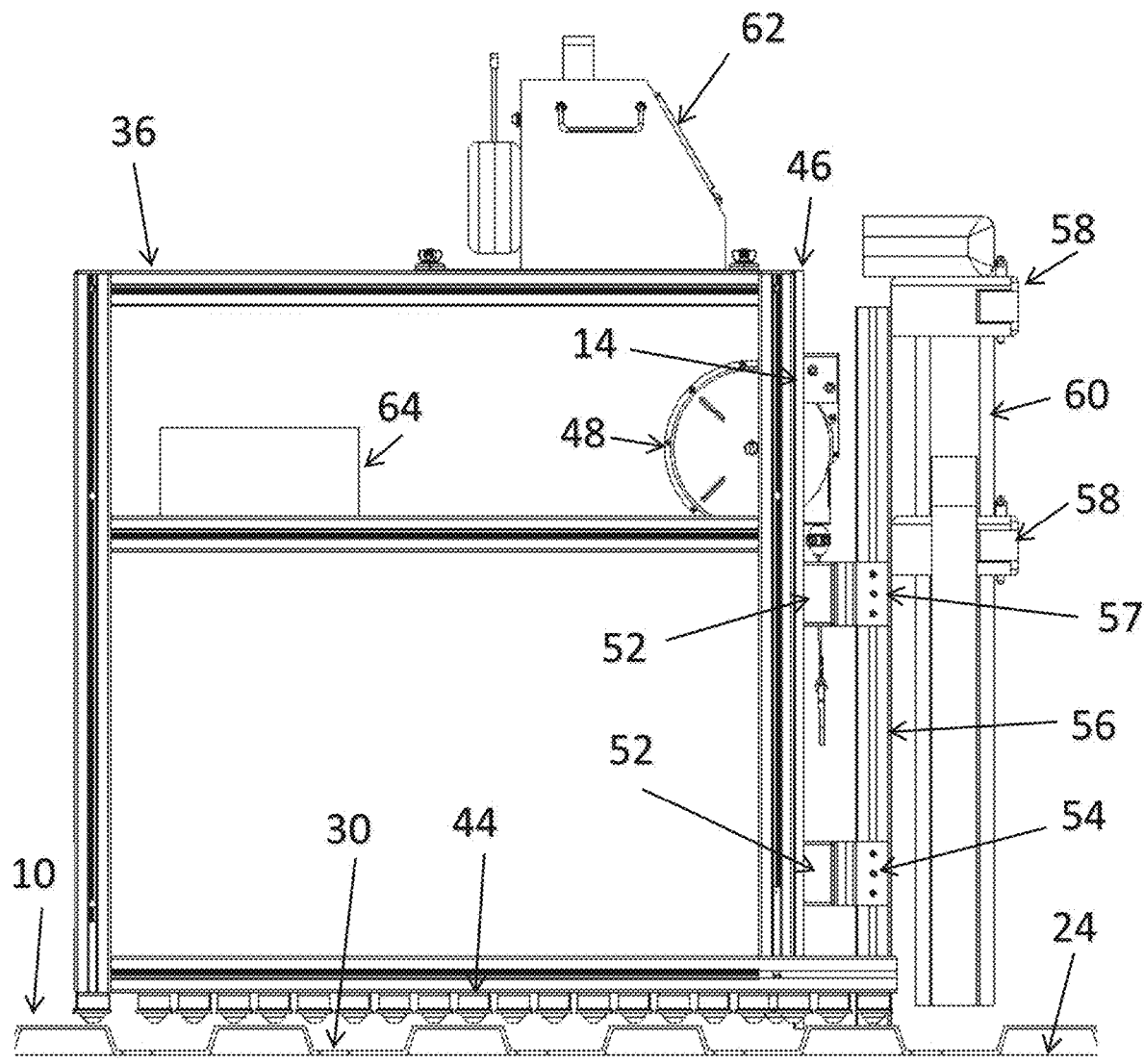
FIG. 3 is a side view of the flattening and fastening cart.
Figure 4:
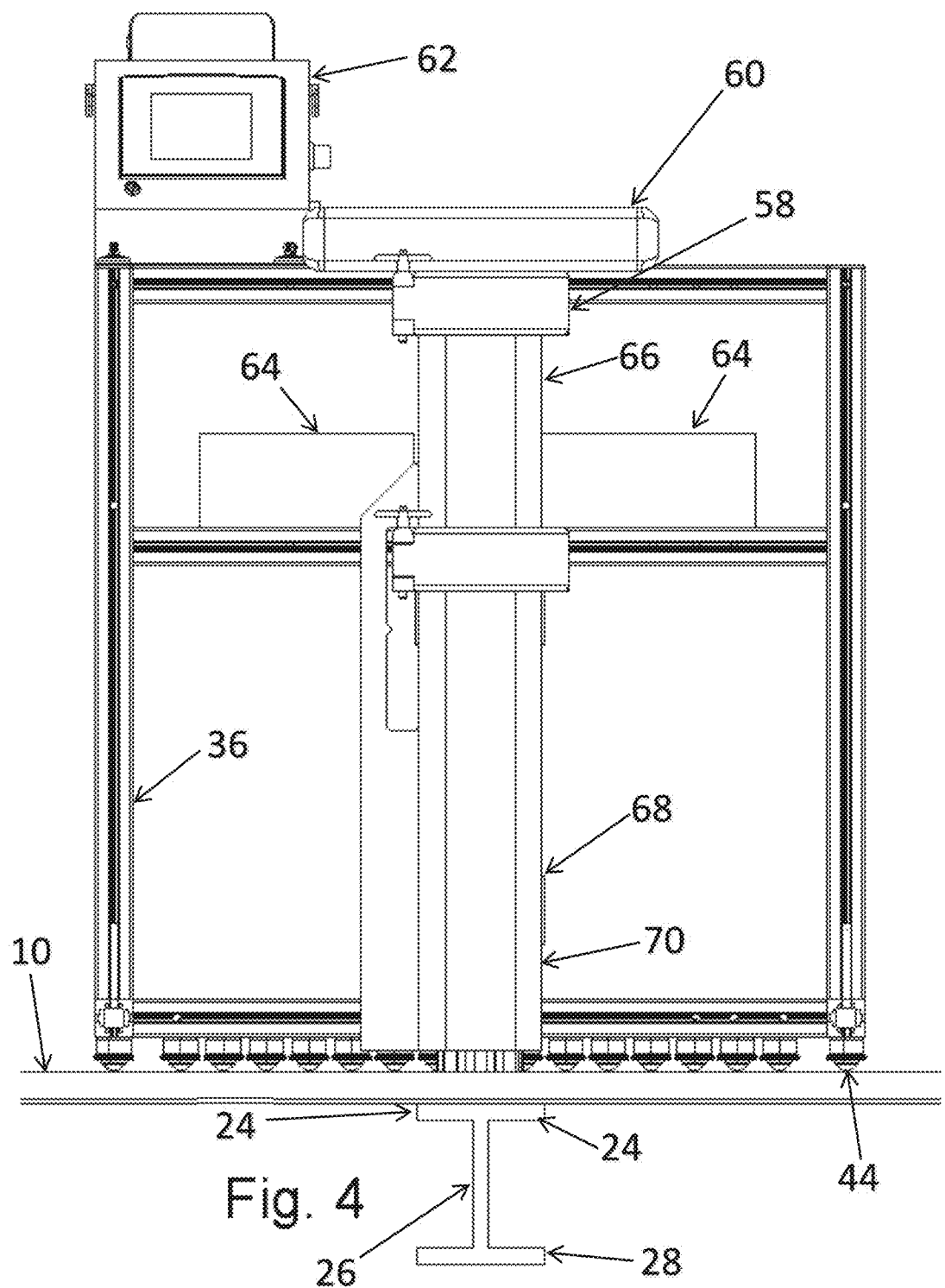
FIG. 4 is a front view of the flattening and fastening cart.
Figure 5:
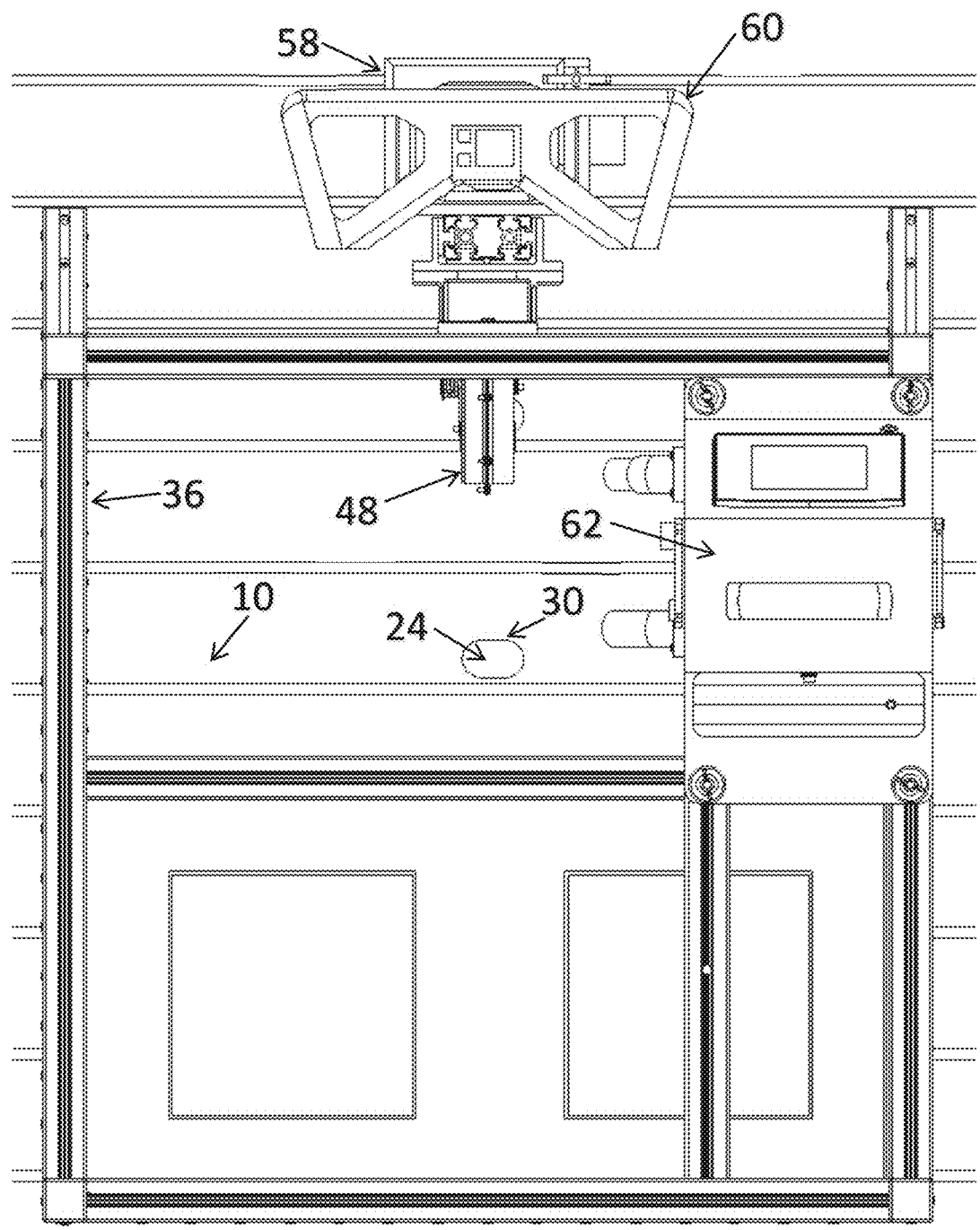
FIG. 5 is a top view of the flattening and fastening cart.
Figure 6:
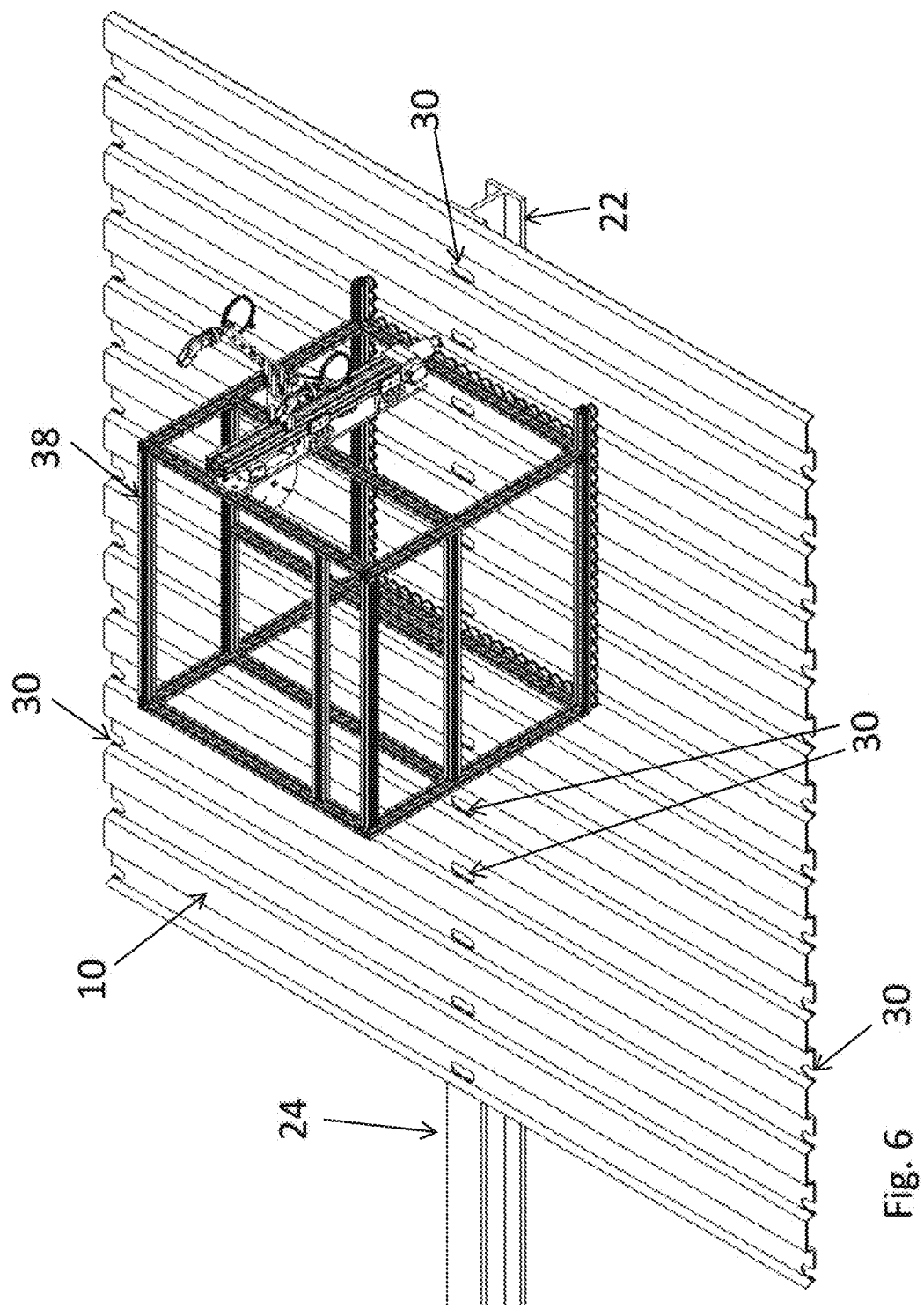
FIG. 6 is a perspective view of a contaminant removing cart.
Figure 7:
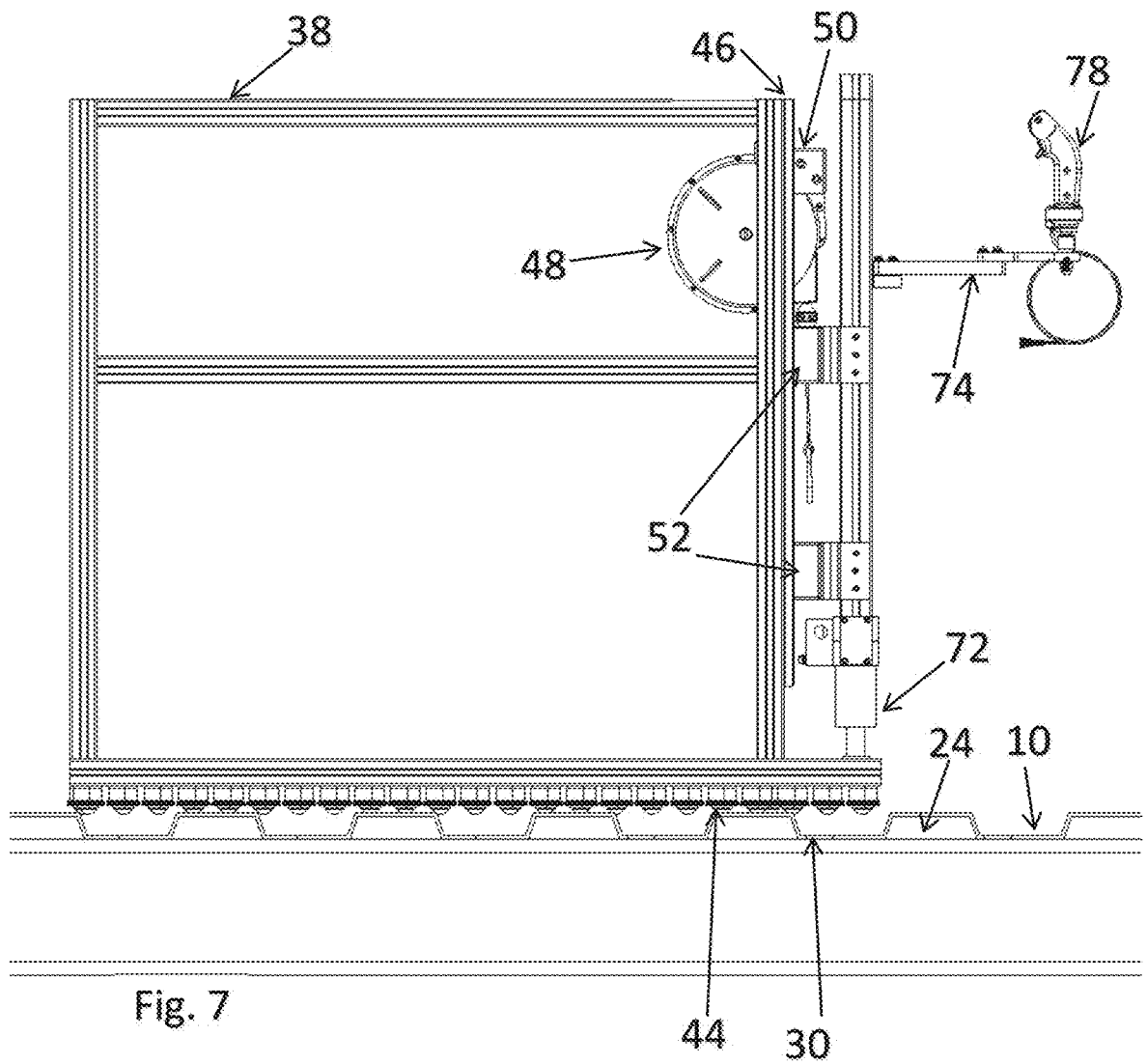
FIG. 7 is a side view of the contaminant removing cart.
Figure 8:
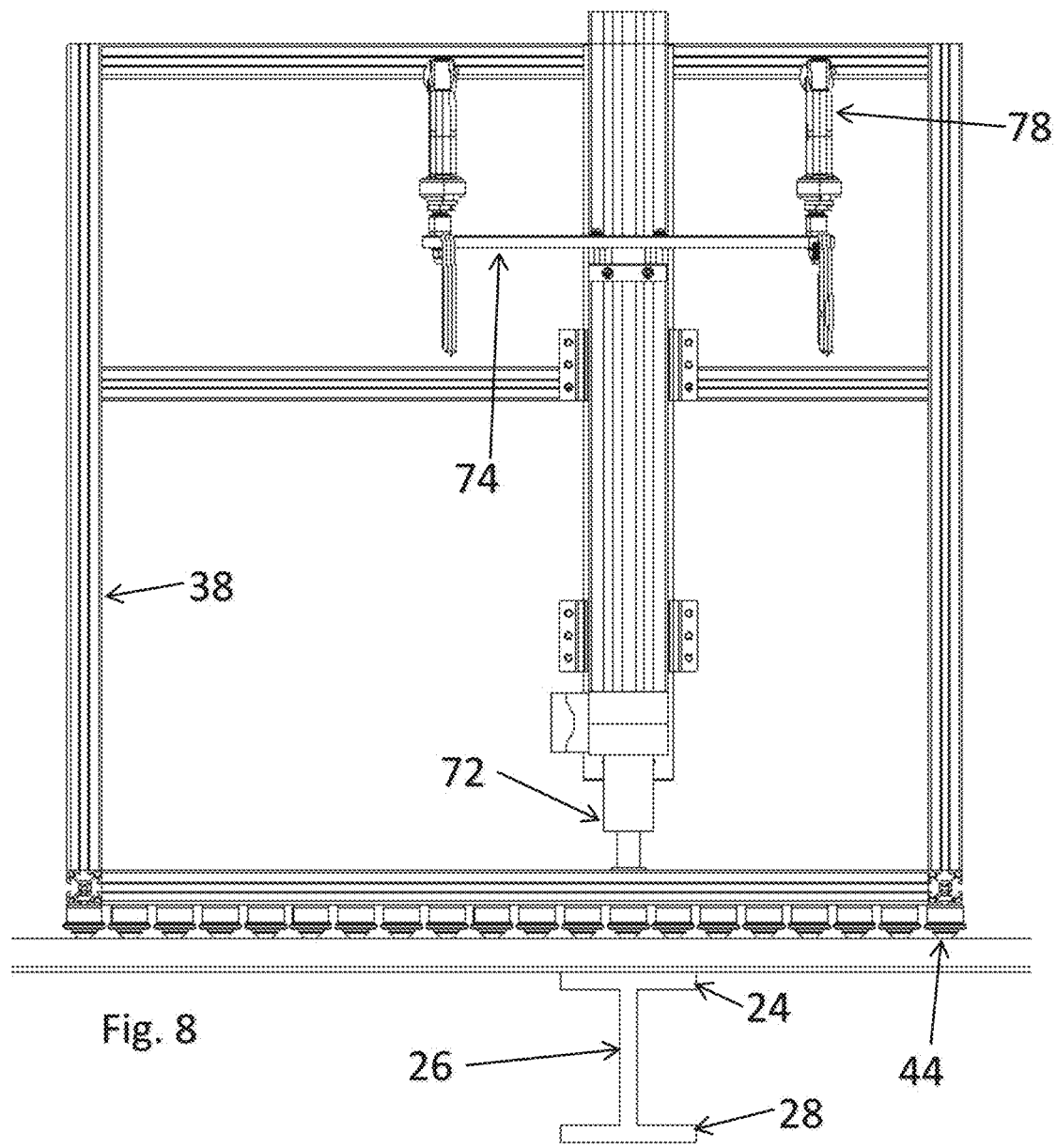
FIG. 8 is a front view of the contaminant removing cart.
Figure 9:
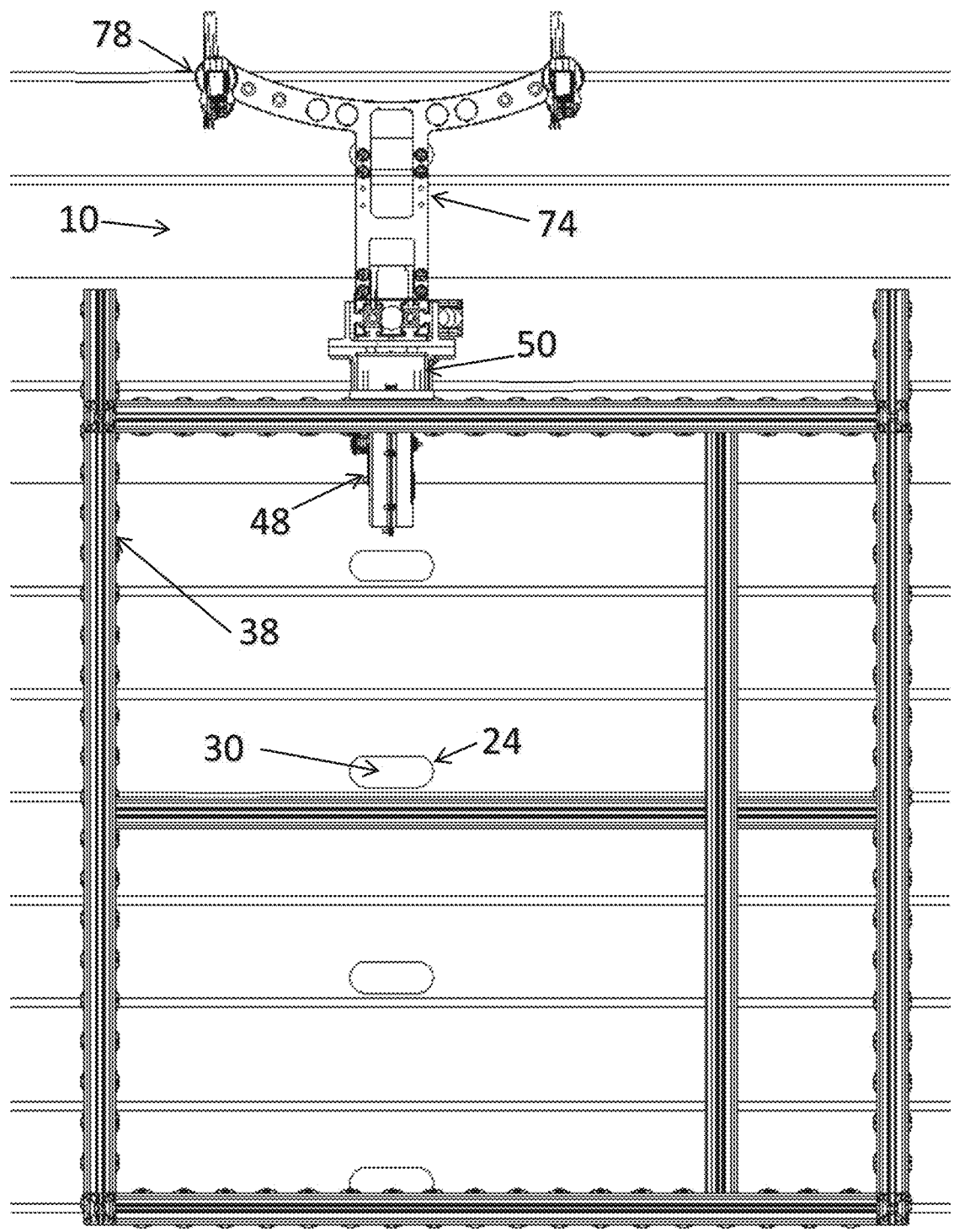
FIG. 9 is an overhead view of the contaminant removing cart.
Figure 10:
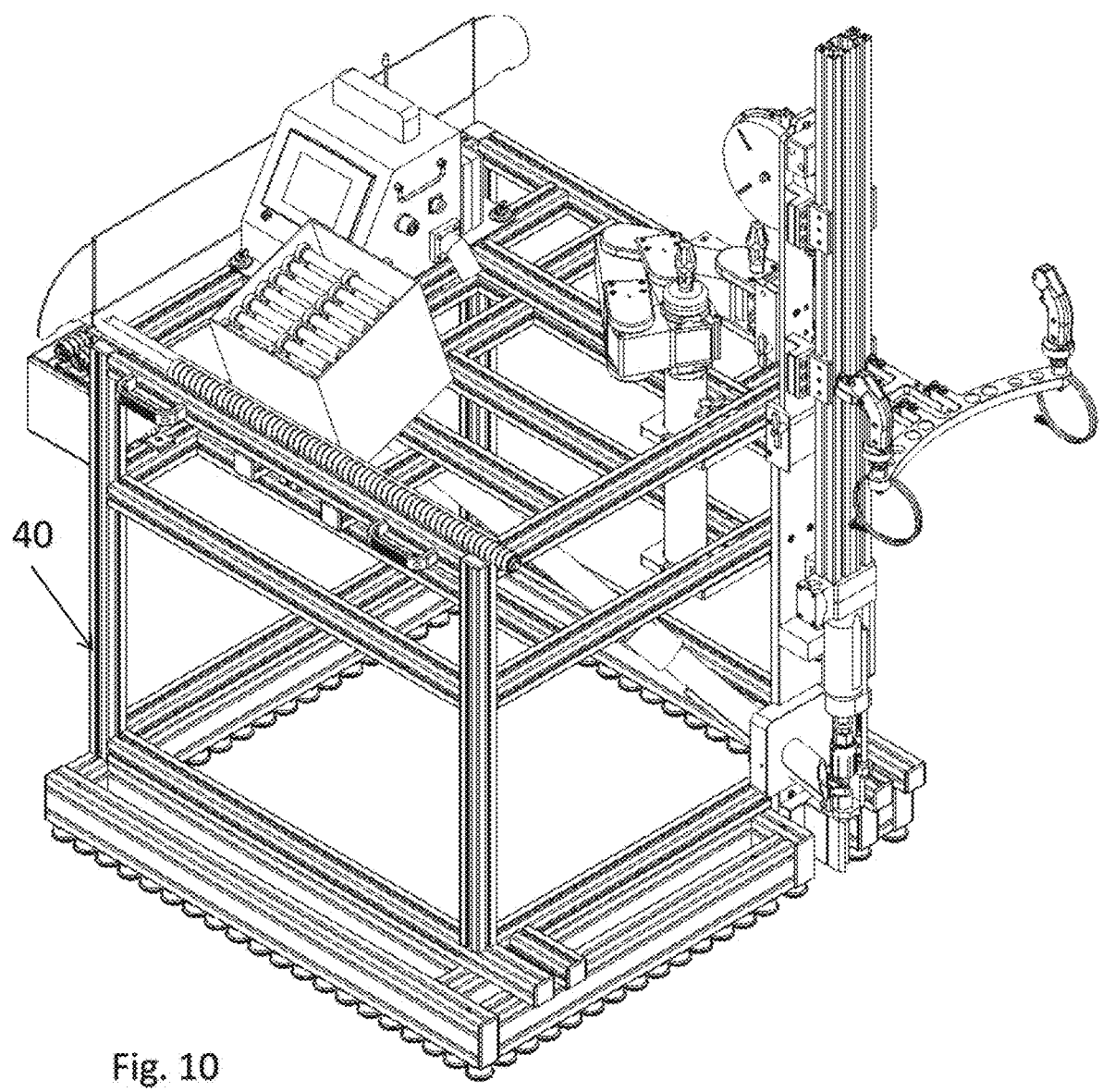
FIG. 10 is a perspective view of the stud welding cart.
Figure 11:
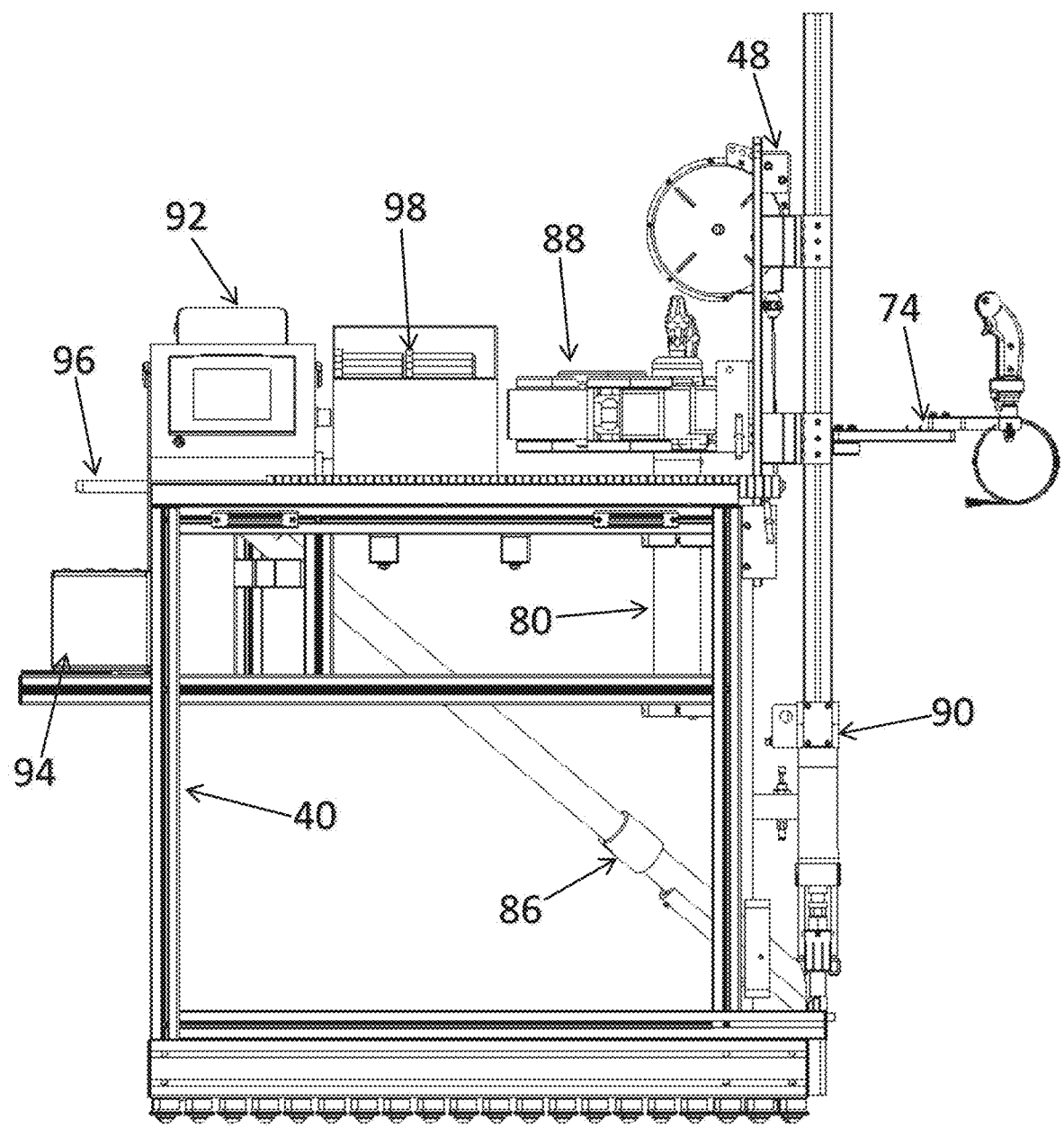
FIG. 11 is a side view of the stud welding cart.
Figure 12:
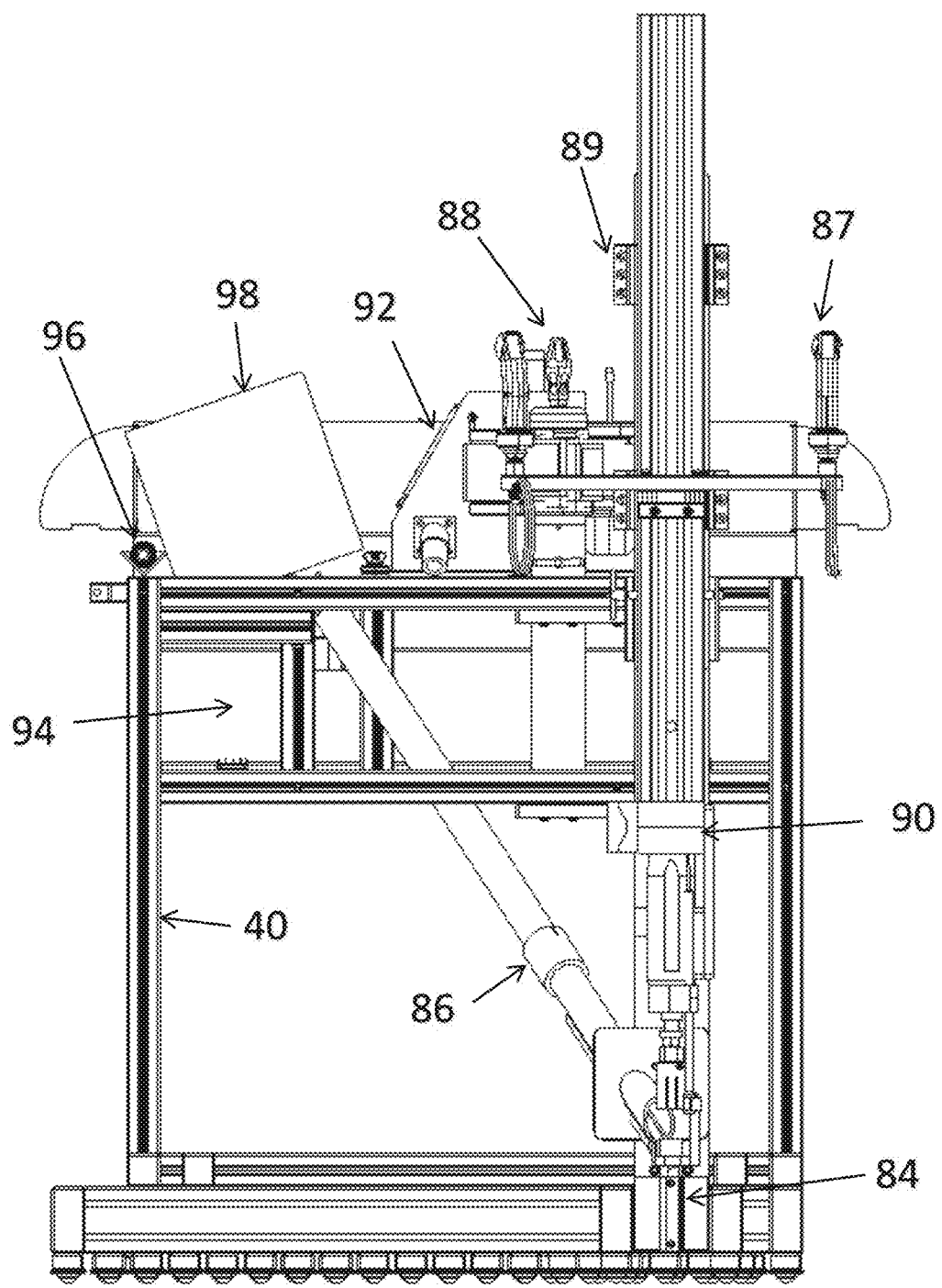
FIG. 12 is a front view of the stud welding cart
Figure 13:
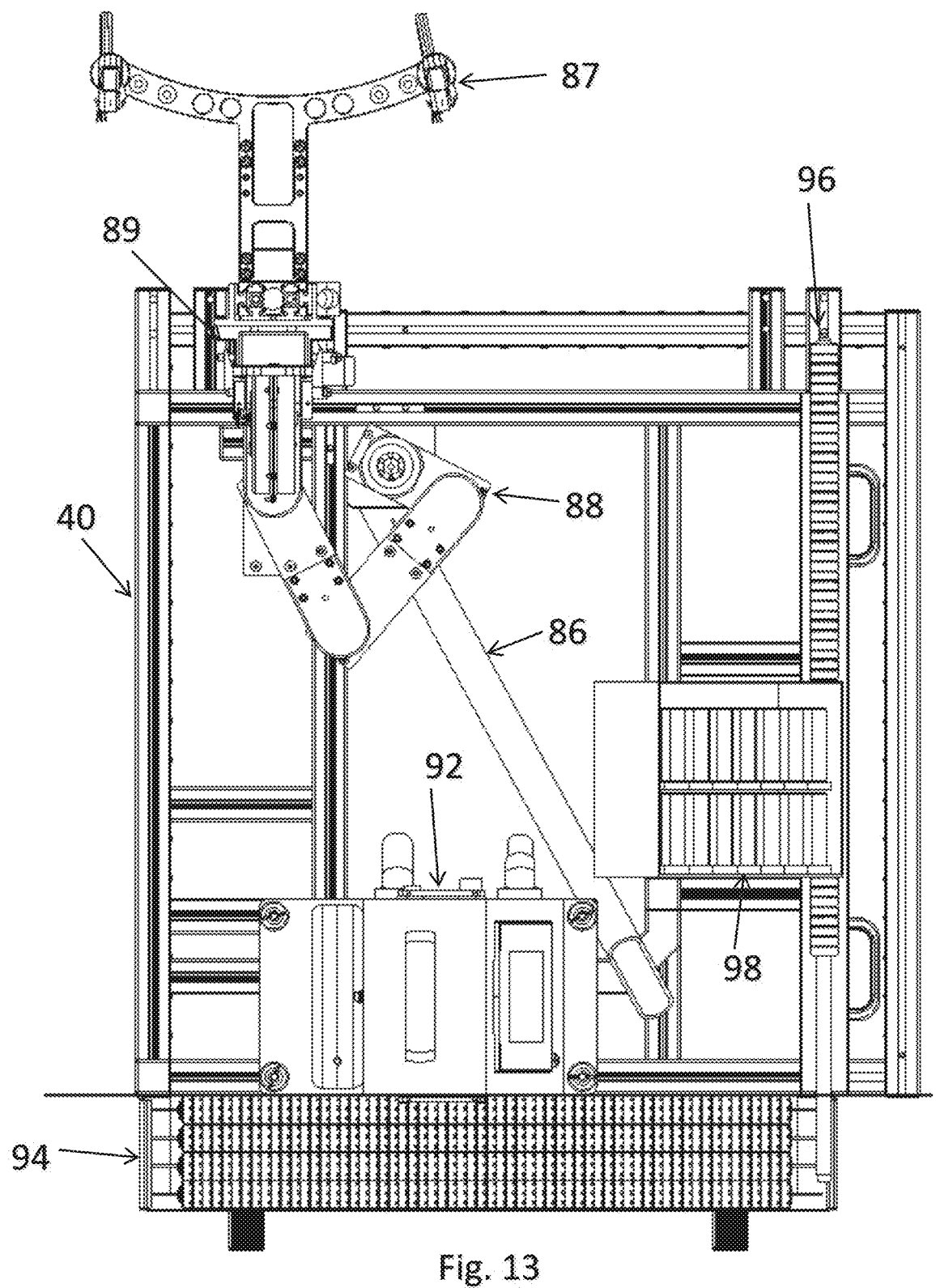
FIG. 13 is a top view of the stud welding cart.

Composite floor structure 10 is flattened, fastened, ground to form a welding zone in the openings and studs weld through a sequence of steps as shown in FIG. 2 making use of a flattening and fastening cart 36, a grinding cart 38 and a stud welding cart 40 as described below.

Figure 17:
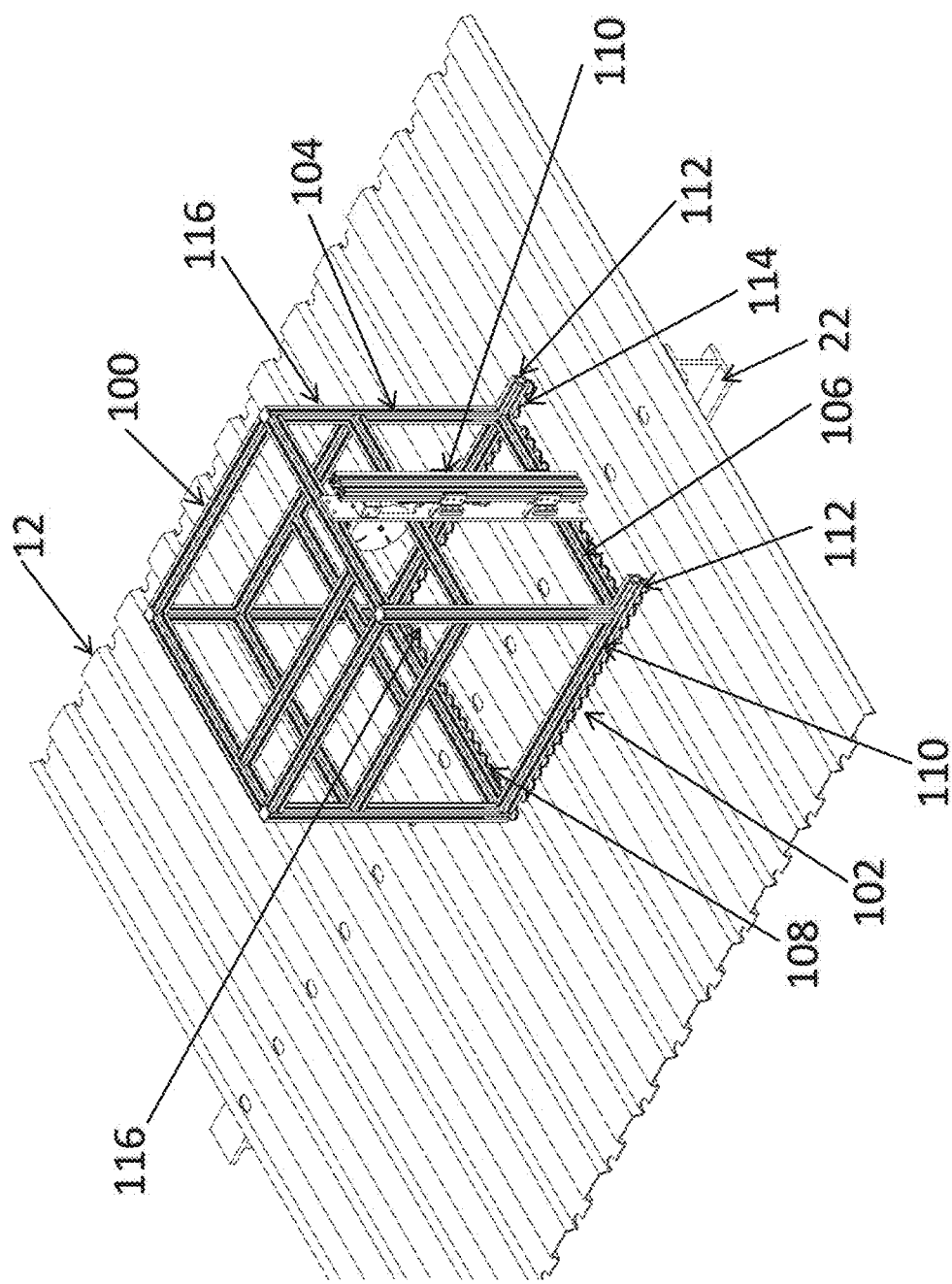
FIG. 17 is a perspective view of the rectilinear structure of the flattening and fastening cart.
Figure 18:
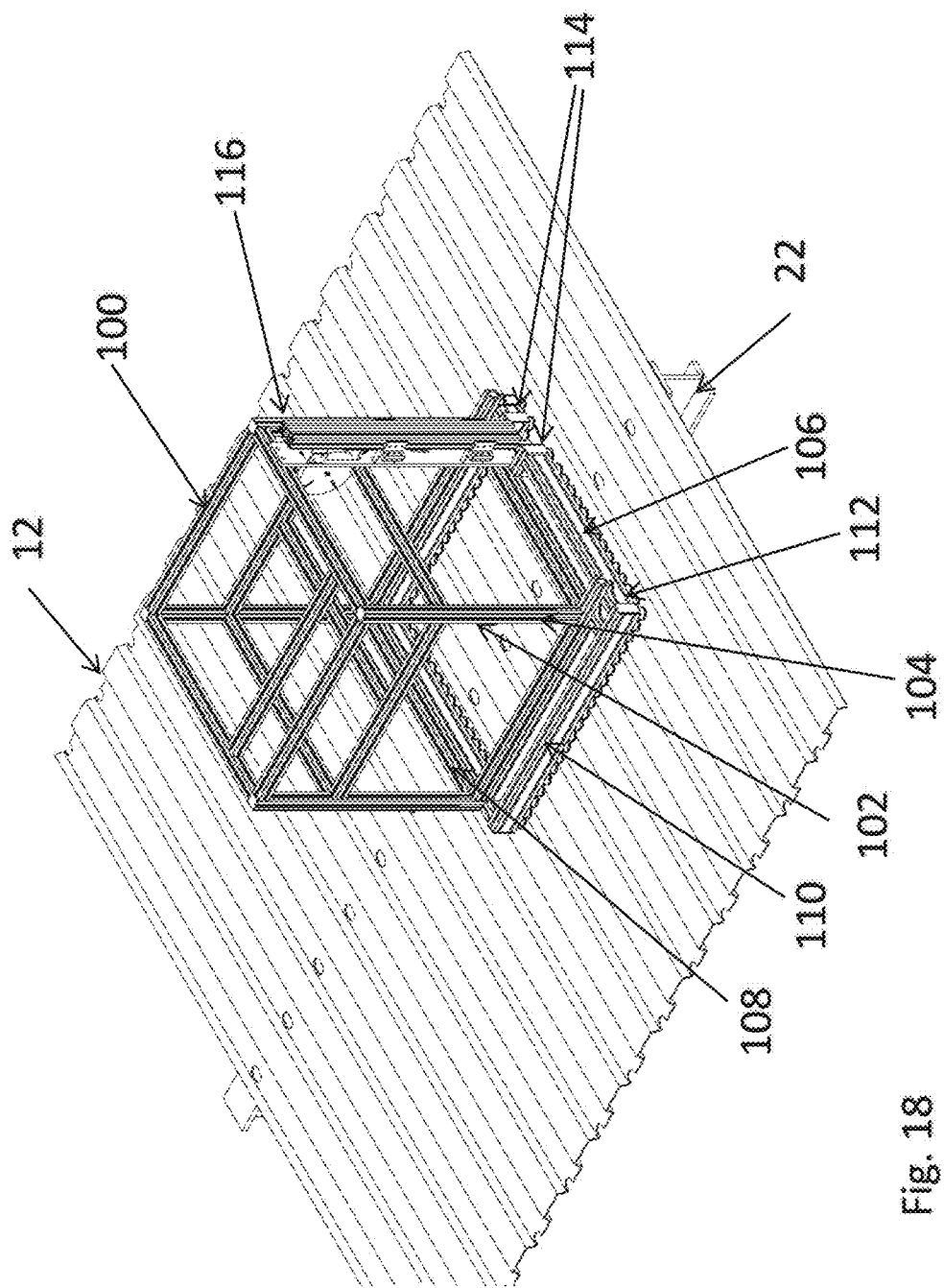
FIG. 18 is a perspective view of the rectilinear structure of the welding cart.

As more particularly shown in the drawings and identified in the attached list of references, each of carts 36, 38 and 40 is a rectilinear structure with a top frame 100, a bottom frame 102 and a front frame 104. Bottom frame 102 has front and rear transverse members 106, 108, respectively, joined to lateral side members 110. Front transverse member 106 is position inside outboard ends 112 of lateral side members 110. A plurality of spaced apart ball rollers 114 are positioned on an underside of transverse members 106, 108 and lateral members 110, said outboard ends 112 with rollers 114 forming an outrigger. As shown in FIG. 17, carts 36 and 38 have one row of rollers and as shown in FIG. 18 cart 40 has two rows of rollers.

In each of carts 36, 38, and 40 front frame is joined to top frame 100 and bottom frame 102 with vertical side members 116 and with an intermediate vertical member 118 with upper and lower bearing brackets for attachment of a vertical side 120 positioned between outboard ends 112 of lateral side members 110. In the case of cart 36, slide 120 is attached to a tool for fastening metal decking panel 12 to the underlying I-beams 22. The weight of cart 36 together with the equipment and supplies loaded thereon flattens metal decking panel 12 against the I-beams 22. In the case of cart 38, the tool removes contaminants from upper flange 24 in the window provided by openings 30 providing a clean welding zone. In the case of cart 40, the tool delivers and welds studs 34 in the cleaned welding zone. An important feature of the rectilinear structure of carts 36, 38 and 40 is that a working end of each tool is held perpendicular to composite floor 10 during the fastening, flattening, grinding or welding operations. Other than for bottom frame 102 and the location of ball rollers 114, cart 40 is as described in U.S. Pat. Nos. 8,507,824 and 9,630,270.

The following is a list of reference numbers shown in the drawings. However, it should be understood that the use of these terms is for illustrative purposes only and use of reference numbers correlating a certain term that is both illustrated in the drawings and present in the claims is not intended to limit the claims to only cover the illustrated embodiment:

10 Composite floor, 12 metal decking panels, 14 ribs, 16 flat panel sections, 18 width sides, 20 length sides, 22 I-beams, 24 upper flange, 26 web, 28 lower flange, 30 openings, 32 centerline, 34 stud, 36 flattening & contaminate cart, 38 contaminate removing cart, 40 stud welding cart, 42 ball transfer, 44 front plate, 46 tool balancer, 48 balancer mount, 50 bearing offset (bracket), 52 extension slide, 54 extension, 56 tool clamp, 58 fastening tool, 60 fastener depth analyzer, 62 storage area for fasteners to add weight for flattening deck, 64 control cable to analyzer, 66 distance sensor, 68 ergonomic spring, 70 contaminate removal tool, 72 switch block extension, 74 moveable trigger handle, 80 column support, assembly, 82 alignment guide assembly, 84 stud catcher assembly, 86 stud trough assembly, 87 switch block assembly, 88 moveable arm assembly, 89 tool balancer assembly, 90 gun extension assembly, 92 time current lift plunge analyzer, 94 assembled ferrule master ferrules, 96 ferrule stick dispenser, 98 box of stud shear connectors, 100 top frame, 102 bottom frame, 104 front frame, 106 front transverse member, 108 rear transverse member, 110 lateral side members, 112 outboard end, 114 ball rollers, 116 vertical side members, 118 intermediate vertical member and 120 vertical slide.

In Use how the New Equipment Will Work in the Field

First Crew: A crew will lay down sheets of decking 12 on upper flange of the I-beams to form a composite floor decking. For now, this process remains the same as traditional. Please note that this new decking is no harder to install, nor does it take any longer to accomplish than the traditional method of laying decking does. In fact, it is believed that the overall process easier to complete and with a much higher level of quality assurance.

Figure 14:
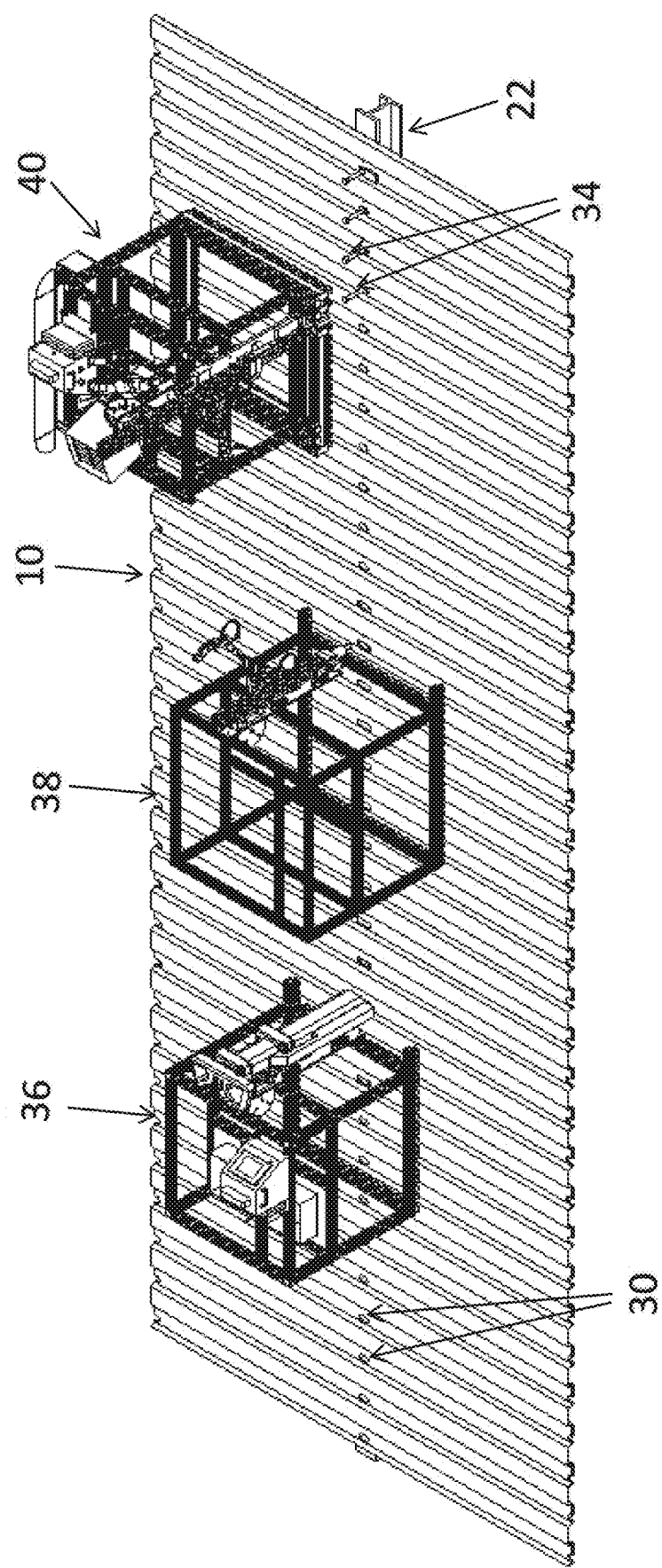
FIG. 14 is a perspective view of all three carts working over the newly painted beams and deck.
Figure 15:
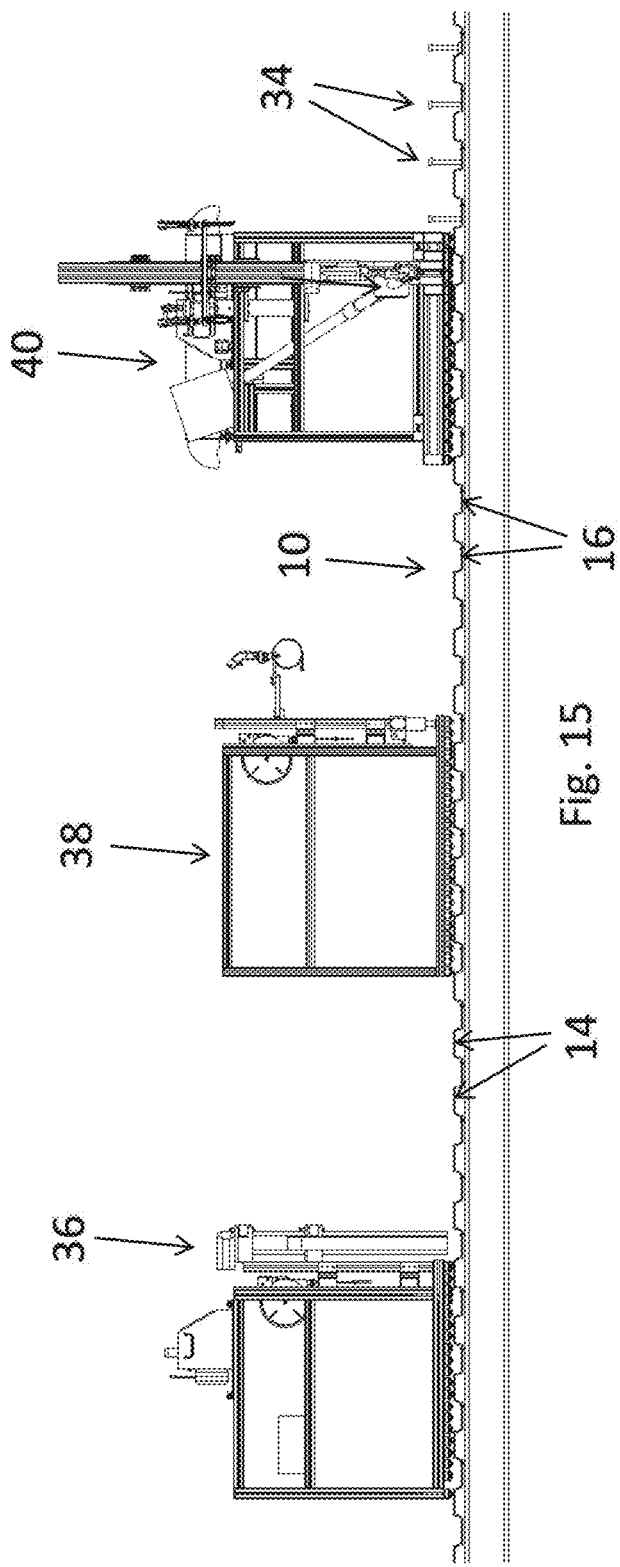
FIG. 15 is a side elevation of all three carts working together.
Figure 16:
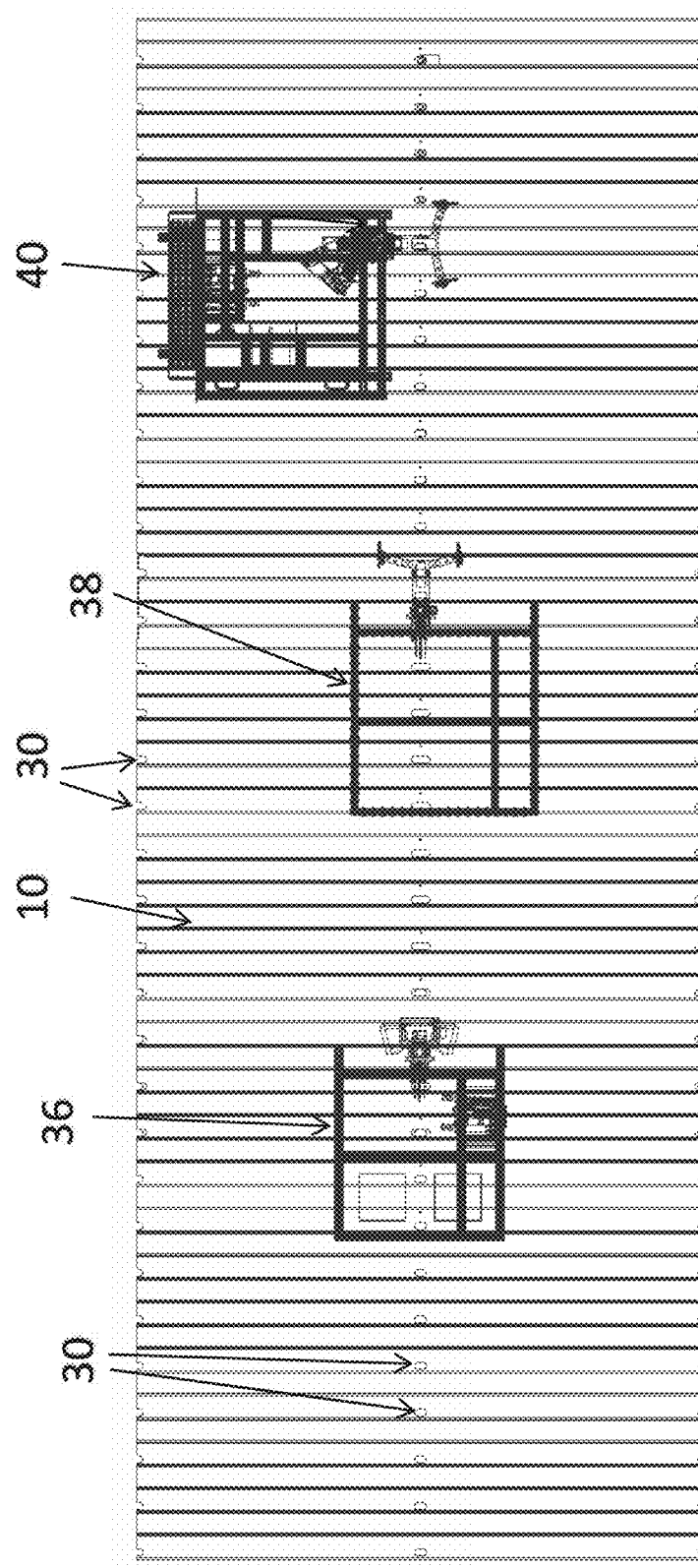
FIG. 16 is a top view of all three carts working together.

Turning now to FIGS. 14-16:

Second Crew: The workmen may continue to use the traditional method of puddle welding a ⅝" diameter puddle weld to fasten the decking. But that requires a welding machine with long weld cables and ground cable, etc. However in the traditional method, the worker cannot be positive that there was a full or complete ⅝" puddle weld penetration on each and every weld, etc. to the hidden beam. With see-through slots 30, fastening of the decking panel 12 with cart 36 is more efficient with better quality. A worker can confirm that the distance between the lower of the decking and upper flange is tight.

Third Crew: This would be an additional crew compared to the traditional method and is part of the new design. In it, another worker with cart 38 will grind the area over the center flange of the beam and inside the opening 30 to clean and remove any residual contaminates and prepare the weld zone for an optimum weld.

Fourth Crew: The next crew with cart 40 will place the ferrules and stud into through openings 30 and weld the stud shear connectors 34 to the I-beam. Because the welder does not have to burn through the thicknesses of decking and the galvanize coating on the decking approximately 30% less weld current is required and the weld time is shorter, thus reducing cost. Weld quality is far superior on clean steel than through galvanized decking.

Fifth Crew: One ironworker will place any desired covers over any voids showing through the steel and fasten the covers with fasteners.

In view of the present disclosure, among the differences to the traditional process of laying a decking, fasting the decking and welding stud shear connectors may be mentioned:

Paint, galvanize, or coat top flanges of beams—never before allowed

Install new deck with openings—never before done

New deck allows unlimited thickness and the number of sheets that can be stacked—never before allowed Openings in deck help determine center of beam to help reduce arc blow and if deck is down tight or not—never before accomplished Ergonomically flatten deck—never before done Ergonomically fasten deck and scientifically inspect the fastener depth—never before done Ergonomically Grind or clean weld zone to be free of contaminates—never before done Ergonomically weld studs faster, with less time and current, less arc blow and less weld fumes—never before done when comparing to traditional welding thru deck in composite construction Cap any openings in the deck—never before done In view of the above, it will be seen that the several benefits of the invention noted above are achieved and other advantageous results attained. As various changes could be made in the above constructions and methods without departing from the scope of the invention, it is intended that all matter contained in the above description or shown in the accompanying drawings shall be interpreted as illustrative and not in a limiting sense.

What is claimed:

1. An ergonomic method for fastening and flattening a composite floor structure with metal decking having openings over the center of underlying I-beams with a cart having a rectilinear structure with a top frame, a bottom frame and a front frame, said bottom frame has front and rear transverse members joined to lateral side members, said front transverse member is positioned inside outboard ends of lateral side members, a plurality of spaced apart ball rollers or wheels are positioned on an underside of front and rear transverse members and lateral members, said outboard ends with rollers forming an outrigger, said front frame joined to top frame and bottom frame with vertical side members and with an intermediate vertical member with upper and lower brackets for attachment of a vertical slide positioned between outboard ends of lateral side members, said fastener tool attached to the slide, said method comprising:

flattening the metal decking by passing the cart over the decking;
   maintaining the cart parallel with the metal decking with the outrigger during passing the cart over the decking; and,
   positioning the working end of the tool perpendicular to the composite floor structure.

2. The method of claim 1 wherein an analyzer is carried by the cart, said method further comprising using the analyzer to confirming that the decking has been properly fastened to the underlying I-beams.

3. The method of claim 1 wherein a tool balancer is carried by the cart, said method further comprising using the tool balancer to reduce the pressure that a worker needs to apply on the fastener tool while standing upright.

4. In a composite floor structure with metal decking having openings over the center of underly I-beams, an ergonomic method for grinding a top flange of the underlying I-beams through the openings with a cart having a rectilinear structure with a top frame, a bottom frame and a front frame, said bottom frame has front and rear transverse members joined to lateral side members, said front transverse member is positioned inside outboard ends of lateral side members, a plurality of spaced apart ball rollers or wheels are positioned on an underside of front and rear transverse members and lateral members, said outboard ends with rollers forming an outrigger, said front frame joined to top frame and bottom frame with vertical side members and with an intermediate vertical member with upper and lower brackets for attachment of a vertical slide positioned between outboard ends of lateral side members, a grinding tool attached to the slide, said method comprising;

passing the cart over the decking;
   grinding the top flange of the underlying beams through the openings with the grinding tool; and,
   maintaining the cart parallel with the composite floor structure with the outrigger during passing of the cart over the decking.

5. The method of claim 4 further comprising passing a welding cart with a welding tool over the decking and welding studs into the clean welding zones.

6. The method of claim 4 further comprising passing a welding cart with a welding tool over the decking and welding studs into the clean welding zones, said welding cart comprising a rectilinear structure with a top frame, a bottom frame and a front frame, said bottom frame has front and rear transverse members joined to lateral side members, said front transverse member is positioned inside outboard ends of lateral side members, a plurality of spaced apart ball rollers or wheels are positioned on an underside of front and rear transverse members and lateral members, said outboard ends with rollers forming an outrigger, said front frame joined to top frame and bottom frame with vertical side members and with an intermediate vertical member with upper and lower brackets for attachment of a vertical slide positioned between outboard ends of lateral side members, said welding tool attached to the slide, said outrigger maintaining the cart parallel with composite floor structure and a working end of the tool perpendicular to the composite floor structure.

\* \* \* \* \*